(12) United States Patent
Aquilina et al.

(10) Patent No.: US 8,814,394 B2
(45) Date of Patent: Aug. 26, 2014

(54) ADJUSTABLE HEADLAMP ATTACHMENT WITH PEDESTRIAN PROTECTION

(71) Applicant: Ford Global Technologies, LLC, Dearborn, MI (US)

(72) Inventors: Anthony N. Aquilina, Royal Oak, MI (US); Ketan K. Desai, Farmington Hills, MI (US); Ivan Estrada Sanchez, Cuauhtemoc (MX); Gary E. Henige, Northville, MI (US); Stephen K. Helwig, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 13/719,355

(22) Filed: Dec. 19, 2012

(65) Prior Publication Data
US 2014/0169020 A1 Jun. 19, 2014

(51) Int. Cl.
B60Q 1/00 (2006.01)
B60Q 1/04 (2006.01)

(52) U.S. Cl.
CPC ................... B60Q 1/0483 (2013.01)
USPC .......... 362/368; 362/362; 362/523; 362/538; 362/546

(58) Field of Classification Search
CPC .... B60Q 1/0683; B60Q 1/068; B60Q 1/2619; B60Q 1/28; F21S 48/335; F21V 19/02
USPC .................. 362/362, 368, 523, 529, 538, 546
See application file for complete search history.

(56) References Cited

U.S. PATENT DOCUMENTS

| 5,482,348 A | 1/1996 | Mass et al. |
| 6,089,737 A | 7/2000 | Ito |
| 6,908,127 B2 | 6/2005 | Evans |
| 7,690,722 B2 | 4/2010 | Boggess |
| 2008/0018137 A1 | 1/2008 | Troton |
| 2011/0210579 A1 | 9/2011 | Marur et al. |

Primary Examiner — Meghan Dunwiddie
(74) Attorney, Agent, or Firm — Jason Rogers; MacMillan, Sobanski & Todd, LLC

(57) ABSTRACT

A bracket coupling a headlamp module to a fixed structure is sandwiched between two ribs that constrain the bracket in only the cross-car direction. Internal clearances in the bracket or rib features for accepting attachment bolts are designed to provide fore/aft and up/down position adjustments. The sandwich structure can be locked in (i.e., compressed) for a rigid, final attachment to the vehicle which will nevertheless allow sliding of the bracket within the ribs when subjected to the forces corresponding to an impact.

5 Claims, 7 Drawing Sheets

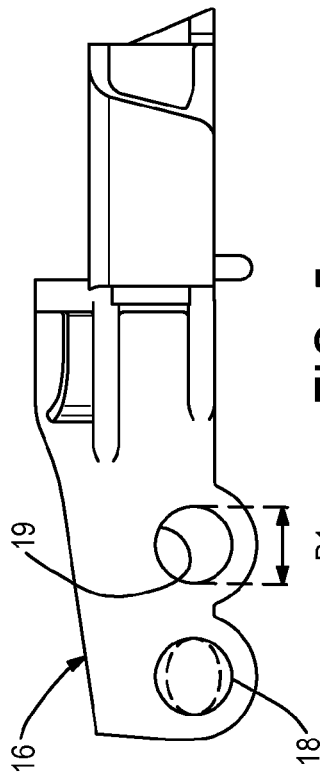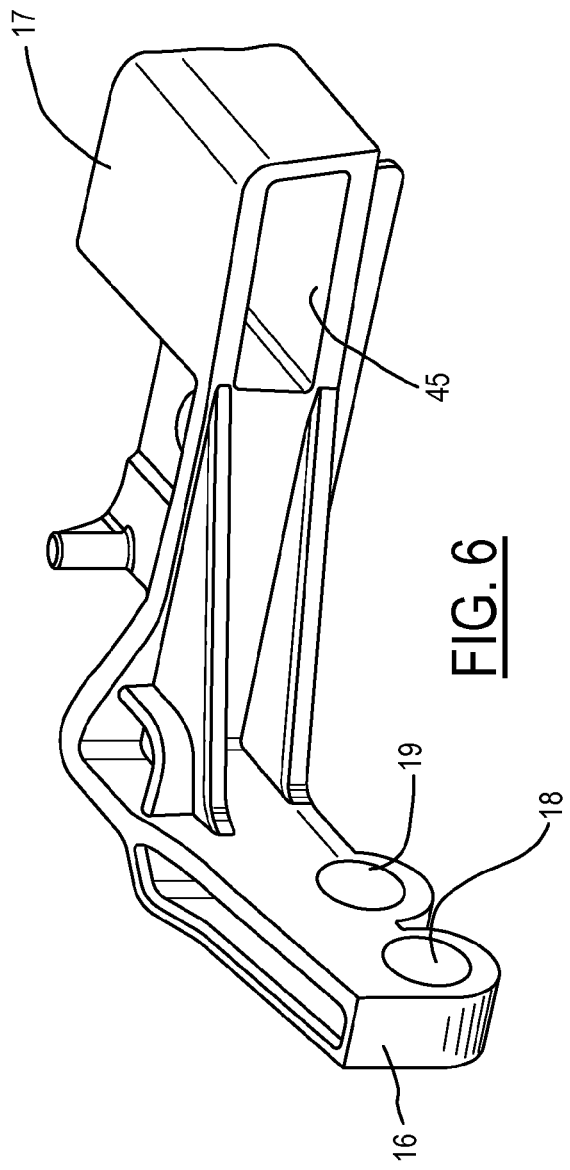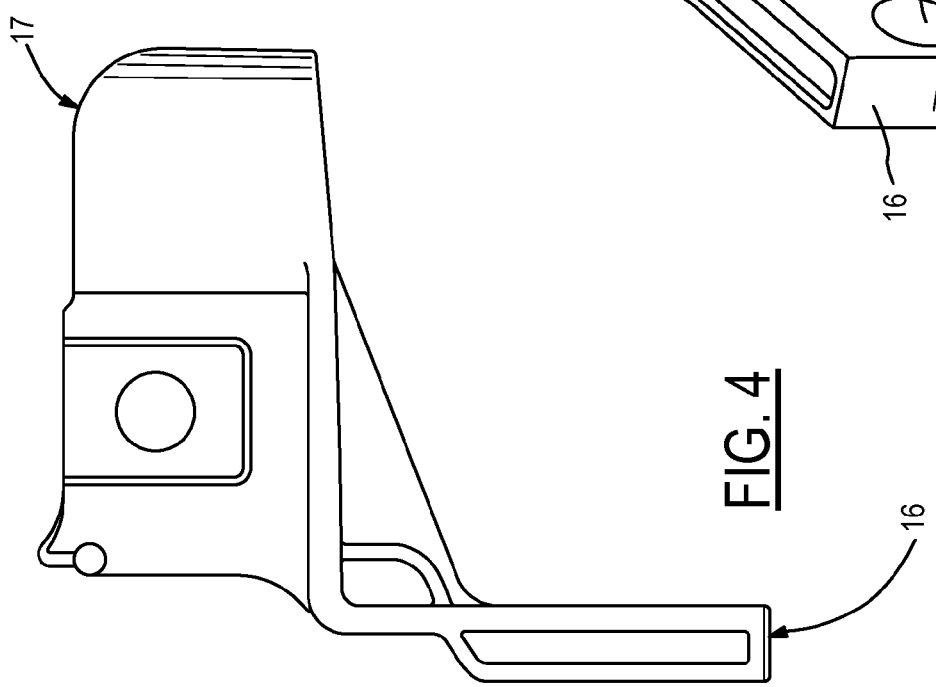

ADJUSTABLE HEADLAMP ATTACHMENT WITH PEDESTRIAN PROTECTION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to a system for mounting a headlamp module to an automotive vehicle, and, more specifically, to a support structure with an adjustable mounting position for a headlamp module while managing reaction forces when the hood is impacted during a collision (e.g., with a pedestrian).

A typical headlamp module is connected to surrounding support structures in a grille opening beneath a forward end of a vehicle hood, usually with three or more connection points. To reduce potential injuries to a pedestrian in a collision with the vehicle, it is desirable for the vehicle hood to crumple or collapse in order to lessen the acceleration imparted to an impactor. However, a crumple zone beneath a hood may have a limited size as a result of a rigid headlamp module and mounting structures beneath the hood. Consequently, break-away features have been used for headlamp mountings so that a greater range of deformation of the hood is achieved. However, breakaway components may have disadvantages such as poor control over the force at which breaking occurs and the added repair costs for the broken components.

A further problem of the prior art for mounting headlamp modules to a vehicle support structure relates to assembly tolerances in which structures being interconnected may not line up properly. A typical headlamp module may have three or more distinct interconnection points around its perimeter. Each connection point may be mounted to different vehicle components such as a grille opening reinforcement or a vehicle frame rail, for example. Variability in the dimensions and spatial relationships on individual vehicles may result in difficulties in the final assembly connections.

SUMMARY OF THE INVENTION

The present invention employs a bracket for coupling a headlamp module to a fixed structure, wherein the bracket is sandwiched between two ribs that constrain the bracket in only the cross-car direction. Internal clearances in the bracket or rib features for accepting attachment bolts are designed to provide fore/aft and up/down position adjustments. The sandwich structure can be locked in (i.e., compressed) for a rigid, final attachment to the vehicle which will nevertheless allow sliding of the bracket within the ribs when subjected to the forces corresponding to an impact. The sliding movement gives the same increased hood movement as a breakaway component would while potentially avoiding destruction of the bracket. Furthermore, the variability of the locking position provides adjustability to compensate for the assembly tolerances.

In one aspect of the invention, apparatus for a transportation vehicle comprises a headlamp module housing having first and second parallel, upstanding ribs defining a channel therebetween. The channel extends along an axis adapted to be aligned with a front-to-rear direction of the vehicle. The first rib has a first opening disposed within a first substantially planar contact surface and the second rib has a second opening, wherein the first and second openings are coaxial. A first U-nut is slidably clipped onto the second rib having a first receptacle disposed coaxially with the first and second openings. At least one of the first U-nut or second rib provides a second substantially planar contact surface, wherein the first and second contact surfaces define opposite sides of the channel. A compensation bracket has a first end coupled to the headlamp module housing and a second end adapted to be coupled to a rigid support structure of the vehicle, wherein the first end has a first bore disposed coaxially with the first and second openings and the receptacle. A first fastener has first and second ends and a first shaft with a first diameter passing through the first opening, the first bore, the receptacle, and the second opening. The first fastener has a head at the first end with a first bearing surface disposed against the first rib. The second end of the first fastener is gripped by the first receptacle to provide a predetermined compression of the first and second contact surfaces against the first end of the compensation bracket configured to fixedly retain the headlamp module at a desired position with respect to the rigid support structure. At least one of the first bore or the first and second openings receiving the first shaft has an open diameter greater than the first diameter so that the desired position is adjustable. The predetermined compression is adapted to allow sliding between the first end of the compensation bracket and the first and second contact surfaces in response to an external force greater than a predetermined force acting in a plane parallel to the first and second contact surfaces.

BRIEF DESCRIPTION OF THE DRAWINGS

FIGS. 4, 5, and 6 are top, side, and isometric views of the compensation bracket of FIG. 1, respectively.

DETAILED DESCRIPTION OF PREFERRED EMBODIMENTS

Figure 1:
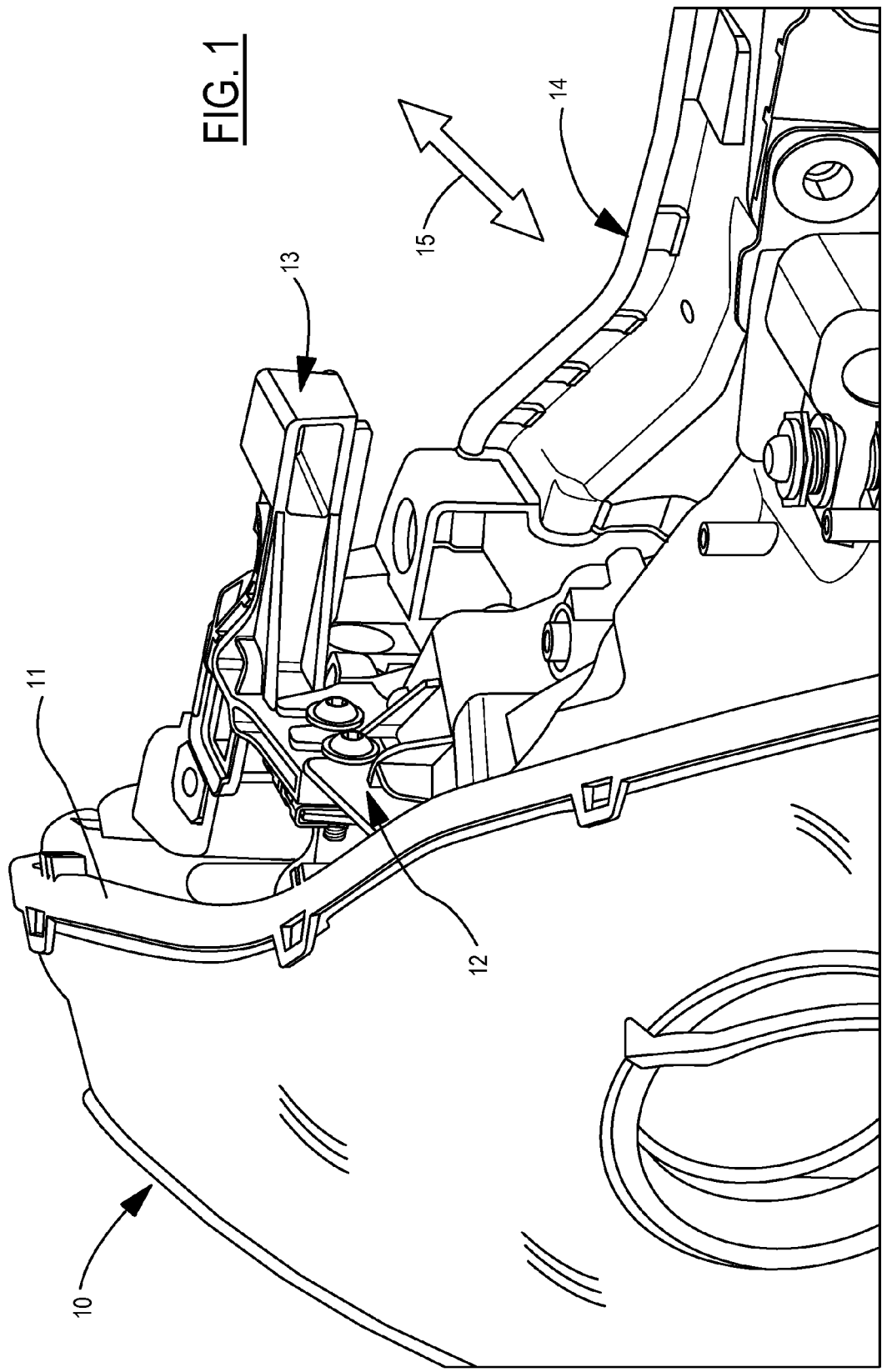
FIG. 1 is a perspective view of a headlamp module and compensation bracket of the present invention.
Figure 2:
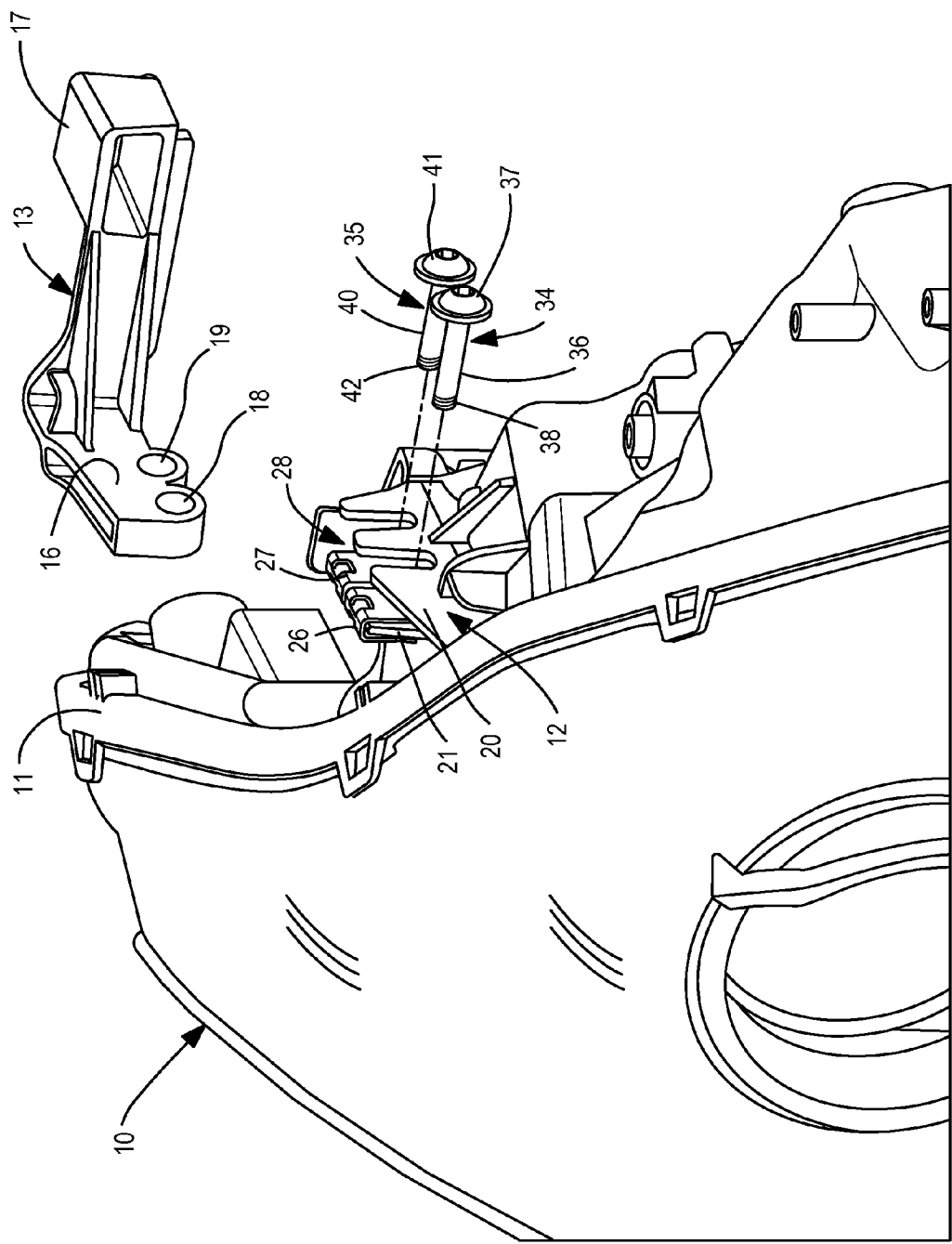
FIG. 2 is a partially exploded view of the headlamp module and bracket of FIG. 1.
Figure 3:
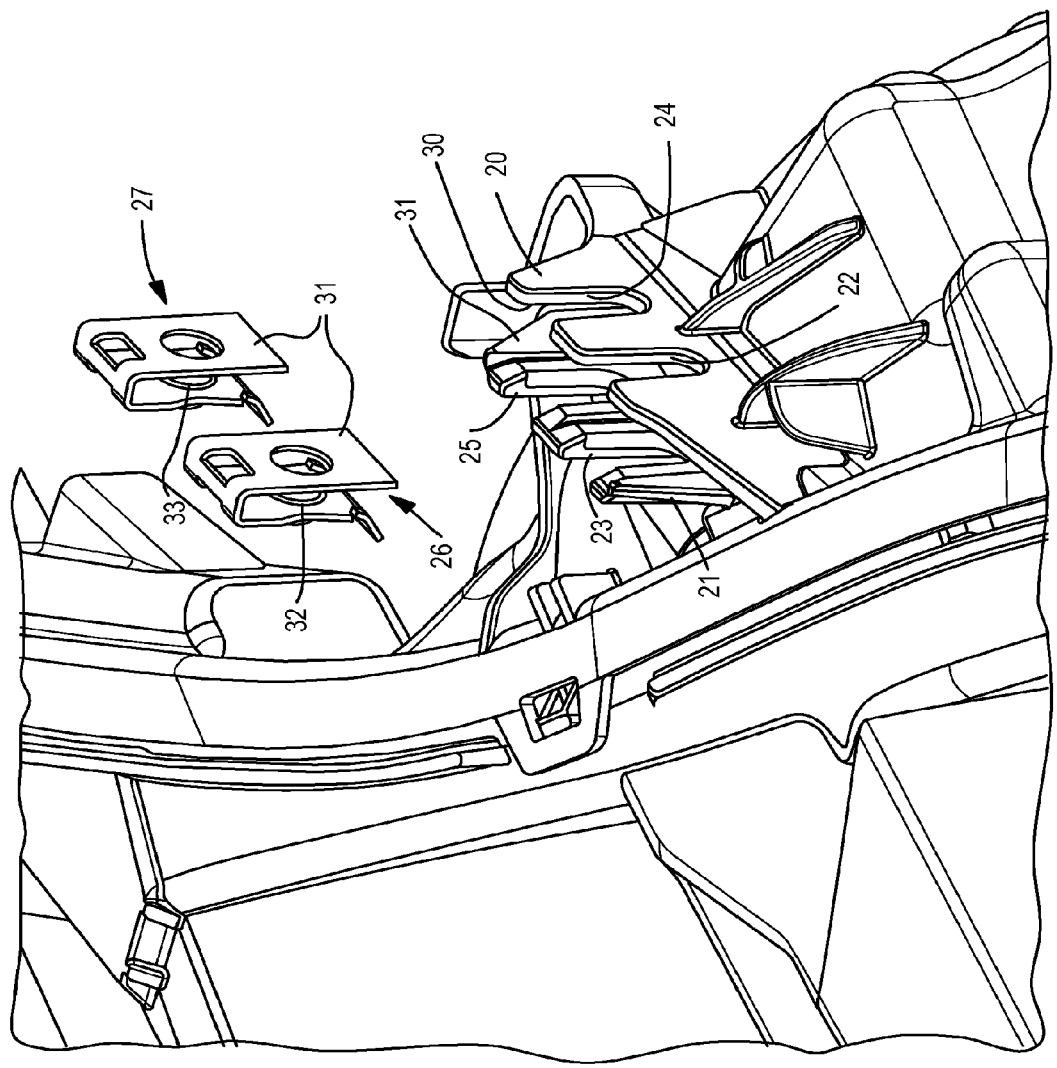
FIG. 3 is a partially exploded, perspective view of mounting features on the headlamp module with U-nuts.

Referring to FIGS. 1-3, a headlamp module 10 includes a housing component 11 with a mounting section 12 that connects with a compensation bracket 13. Bracket 13 has a first end 16 for joining with mounting section 12 and a second end 17 that connects to a rigid support structure of the vehicle such as a grille opening reinforcement (GoR) 14 or another cross car frame member. The vehicle has a front-to-rear direction 15 coinciding with the vehicle's direction of travel. This is also the main direction in which collision with an impactor would occur.

As shown in FIG. 2, first end 16 of bracket 13 has first and second bores 18 and 19 which extend perpendicularly to vehicle direction 15. Mounting section 12 on headlamp housing 11 includes first and second parallel, upstanding ribs 20 and 21 to define a channel 28 with an axis aligned substantially parallel with vehicle direction 15. Channel 28 has first and second contact surfaces 30 and 31 which slidably receive first end 16 of bracket 13. Ribs 20 and 21 prevent bracket 13 from moving in the cross-car direction.

First rib 20 has a first opening 22 which may be formed as a U-shaped slot opened at the top to provide a height adjustment of the mounting position. Second rib 21 has a second opening 23 disposed coaxially with first opening 22, which may also be formed as a U-shaped slot. First rib 20 has a third opening 24 coaxially disposed with a fourth opening 25 on second rib 21, both of which may also be U-shaped slots. A first U-nut 26 is slidably clipped onto second rib 21 and has a first receptacle 32 disposed coaxially with openings 22 and 23. U-nut 26 may provide a portion of second contact surface 31. Similarly, a U-nut 27 is slidably clipped onto second rib 21 over fourth opening 25 to place its second receptacle 33 coaxially with openings 24 and 25. Preferably, receptacles 32 and 33 may be threaded in order to secure first and second fastening bolts 34 and 35. More specifically, a shaft 36 of first fastening bolt 34 passes through first opening 22, bore 18, opening 23, and receptacle 32 so that a bolt head 37 bears against first rib 20 and a threaded end 38 is gripped by receptacle 32. Shaft 36 of fastening bolt 34 has a first diameter in the regions passing through openings 22 and 23 and bore 18. Likewise, fastening bolt 35 has a shaft 40 having a second diameter (which may be equal to the first diameter) passing through openings 24 and 25 with a threaded end 42 received by receptacle 33 and a head 41 bearing against first rib 20.

Fastening bolts 34 and 35 may be tightened to provide a predetermined compression of contact surfaces 30 and 31 against first end 16 of bracket 13, wherein the compression is configured to fixedly retain the headlamp module at a desired position with respect to the rigid support structure. At least either 1) the open diameters of openings 22 and 23 or 2) the open diameter of bore 18 is greater than the first diameter of shaft 36 so that the relative position between bracket 13 and mounting section 12 is adjustable. During assembly, first end 16 and bores 18 and 19 are more easily aligned with bolts 34 and 35 extending through the rib openings and into U-nuts 26 and 27. The open diameters of openings 24 and 25 and/or bore 19 are likewise greater than the diameter of shaft 40. Although bores 18 and 19 are shown with circular cross-sections, other shapes are possible. Moreover, clearances for movement in different directions can be accommodated by providing different directions for any non-circular diameter increases of either the rib openings or the bracket bores.

FIGS. 4-6 show compensation bracket 13 in greater detail. In the side view of FIG. 5, dashed lines inside bore 18 illustrate an alternative cross-sectional shape (e.g., oval) in which the direction of the increased diameter of bore 18 would provide a front-to-back position adjustment. Bore 19 has a circular cross-section with a diameter $D_1$ in which bracket 13 provides both front-to-back and up-and-down adjustment. As shown in FIG. 6, second end 17 includes a mechanical connector 45 of any suitable type for joining bracket 13 to the rigid structure.

Figure 7:
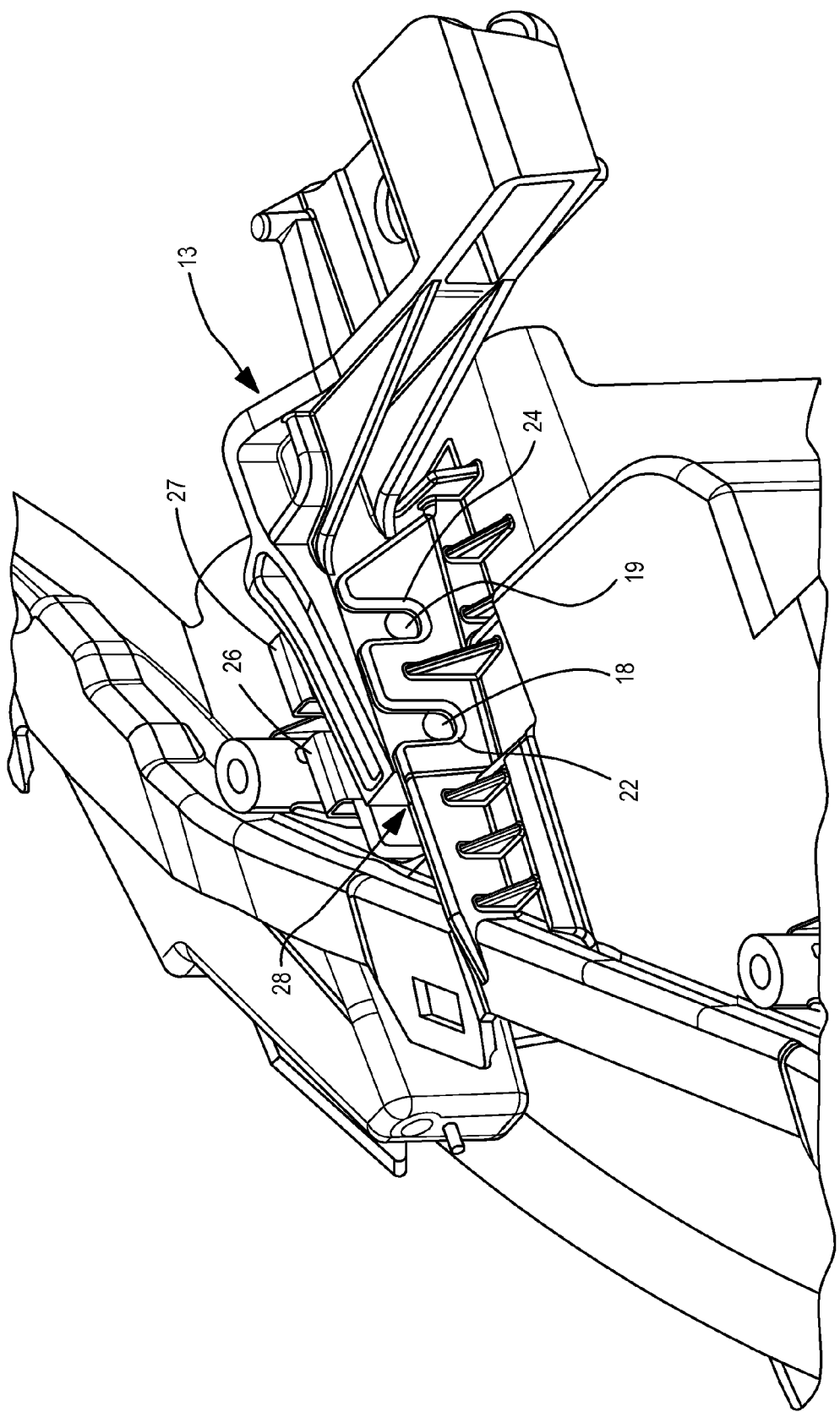
FIG. 7 is a perspective view of the compensation bracket between the headlamp module ribs with the fastening bolts removed.

FIG. 7 shows the initial installation of bracket 13 into channel 28 so that bores 18 and 19 are aligned within openings 24 and 25. U-nuts 26 and 27 may be moveable on rib 21 in order to align the receptacles with bores 18 and 19. Alternatively, rib 21 may include respective recesses for receiving U-nuts 26 and 27 at a fixed position, or U-nuts 26 and 27 may otherwise be made non-slidable on rib 21. Nevertheless, the larger diameter of bores 18 and 19 ensure that the receptacles are accessible to the fasteners. Even if U-nuts 26 and 27 are not slidable on rib 21, bracket 13 is slidable over the U-nuts whether it contacts them or not.

Figure 8:
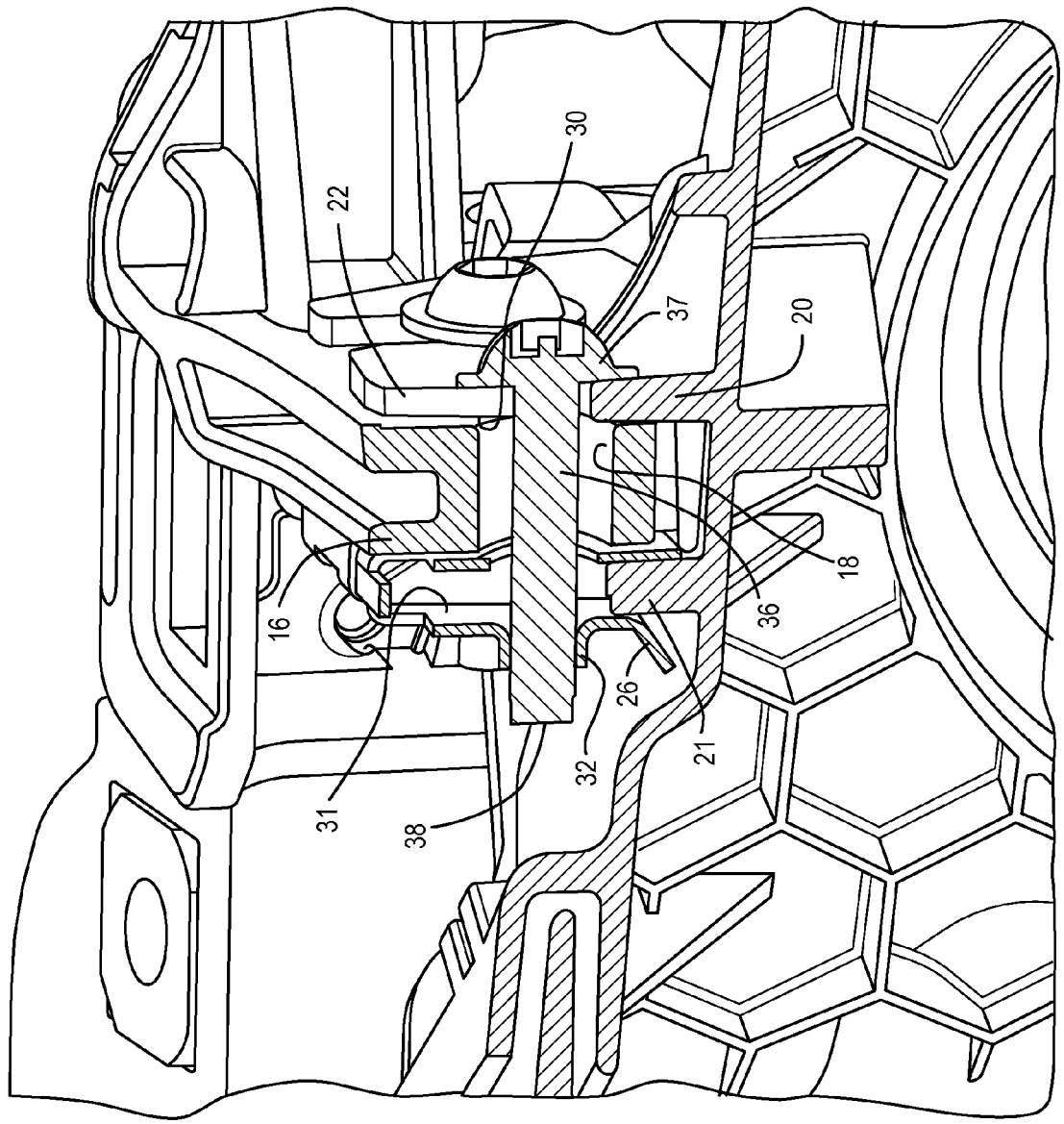
FIGS. 8 and 9 are vertical and horizontal cross sections, respectively, of the mounting features showing the internal clearances around the fastening bolt.

FIG. 8 is a cross section showing the vertical clearance between shaft 36 and bore 18. Prior to tightening of fastener 34, up and down movement is allowed both by the clearance within bore 18 and the upward openings of U-shaped slots 22 and 23.

Figure 9:
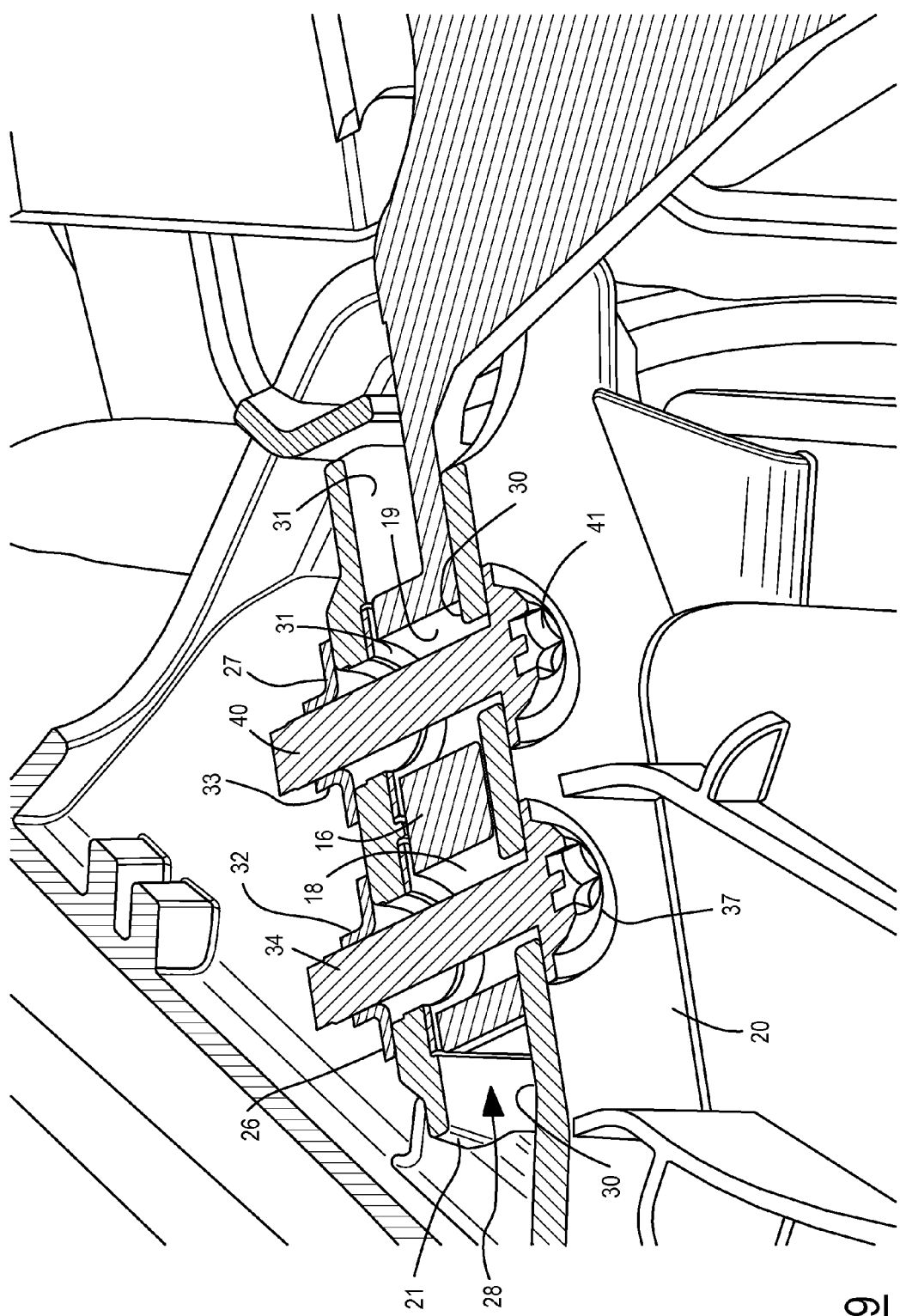

FIG. 9 is a horizontal cross-section showing the horizontal clearance between shaft 34 and bore 18. Thus, movement in the front-two-back direction is permitted by the horizontal clearance of bore 18.

During assembly, the fastening bolts are tightened according a torque that results in a fixed retention and support of the headlamp module. Due to the planar nature of the contact surfaces, sliding is prevented only by the compression force. According to the present invention, the predetermined compression is adapted to allow sliding between the compensation bracket and the sliding contact surfaces of channel 28 in response to an external force greater than a predetermined force acting in a plane parallel to the contact surfaces. In other words, a collision force which is acting downward and/or rearward of the vehicle causes a relative movement between the headlamp housing and the fixed vehicle structure. A portion of the energy of impact is absorbed by the sliding response, thereby lowering the acceleration to the impacting body. Moreover, the likelihood of damage to the headlamp module is reduced.

What is claimed is:

1. Apparatus for a transportation vehicle, comprising:

a headlamp module housing having first and second parallel, upstanding ribs defining a channel therebetween, wherein the channel extends along an axis adapted to be aligned with a front-to-rear direction of the vehicle, wherein the first rib has a first opening disposed within a first substantially planar contact surface, wherein the second rib has a second opening, and wherein the first and second openings are coaxial;

a first U-nut slidably clipped onto the second rib having a first receptacle disposed coaxially with the first and second openings, wherein at least one of the first U-nut or second rib provide a second substantially planar contact surface, wherein the first and second contact surfaces define opposite sides of the channel;

a compensation bracket having a first end coupled to the headlamp module housing and a second end adapted to be coupled to a rigid support structure of the vehicle, wherein the first end has a first bore disposed coaxially with the first and second openings and the receptacle; and a first fastener having first and second ends and a first shaft passing through the first opening, the first bore, the receptacle, and the second opening, wherein the first shaft has a first diameter, wherein the first fastener has a head at the first end with a first bearing surface disposed against the first rib, and wherein the second end of the first fastener is gripped by the first receptacle to provide a predetermined compression of the first and second contact surfaces against the first end of the compensation bracket configured to fixedly retain the headlamp module at a desired position with respect to the rigid support structure;

wherein at least one of the first bore or the first and second openings receiving the first shaft has an open diameter greater than the first diameter so that the desired position is adjustable, and wherein the predetermined compression is adapted to allow sliding between the first end of the compensation bracket and the first and second contact surfaces in response to an external force greater than a predetermined force acting in a plane parallel to the first and second contact surfaces.

2. The apparatus of claim 1 wherein the first and second openings are comprised of U-shaped slots opened at their tops so that height of the desired position is adjustable.

3. The apparatus of claim 1 wherein the first bore has an open diameter in the front-to-rear direction of the vehicle so that the desired position is laterally adjustable.

4. The apparatus of claim 1 wherein the first receptacle is threaded and wherein the shaft of the first fastener is threaded for attachment to the first receptacle.

5. The apparatus of claim 1 wherein the first rib has a third opening disposed within the first substantially planar contact surface, wherein the second rib has a fourth opening, wherein the third and fourth openings are coaxial, wherein the first end of the compensation bracket has a second bore disposed coaxially with the third and fourth openings, and wherein the apparatus further comprises:

a second U-nut slidably clipped onto the second rib having a second receptacle disposed coaxially with the third and fourth openings; and a second fastener having third and fourth ends and a second shaft passing through the third opening, the second bore, the second receptacle, and the fourth opening, wherein the second shaft has a second diameter, wherein the second fastener has a second head at the third end with a second bearing surface disposed against the first rib, and wherein the fourth end of the second fastener is gripped by the second receptacle to provide the predetermined compression in conjunction the first fastener.

\* \* \* \* \*